United States Patent
Kawahara et al.

(10) Patent No.: US 11,031,187 B2
(45) Date of Patent: Jun. 8, 2021

(54) METHOD OF MANUFACTURING SOLID ELECTROLYTIC CAPACITOR, AND METHOD OF MANUFACTURING DISPERSION CONTAINING CONJUGATED ELECTRICALLY CONDUCTIVE POLYMER

(71) Applicant: SHOWA DENKO K.K., Tokyo (JP)

(72) Inventors: Yuta Kawahara, Tokyo (JP); Takashi Ohkubo, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/043,331

(22) PCT Filed: Mar. 26, 2019

(86) PCT No.: PCT/JP2019/013008
§ 371 (c)(1),
(2) Date: Sep. 29, 2020

(87) PCT Pub. No.: WO2019/189257
PCT Pub. Date: Oct. 3, 2019

(65) Prior Publication Data
US 2021/0027953 A1    Jan. 28, 2021

(30) Foreign Application Priority Data
Mar. 30, 2018   (JP) .............................. JP2018-068442

(51) Int. Cl.
*H01G 9/00*     (2006.01)
*C08L 25/14*    (2006.01)
(Continued)

(52) U.S. Cl.
CPC ............ *H01G 9/0036* (2013.01); *C08L 25/14* (2013.01); *H01G 9/025* (2013.01); *H01G 9/048* (2013.01);
(Continued)

(58) Field of Classification Search
CPC ....... H01G 9/0036; H01G 9/025; H01G 9/048
See application file for complete search history.

(56) References Cited

U.S. PATENT DOCUMENTS

2011/0049433 A1   3/2011   Jonas et al.
2012/0212880 A1   8/2012   Ishimaru et al.
(Continued)

FOREIGN PATENT DOCUMENTS

CN   102646515 A   8/2012
CN   107540852 A   1/2018
(Continued)

OTHER PUBLICATIONS

International Search Report dated Jun. 18, 2019 in International Application No. PCT/JP2019/013008.
(Continued)

*Primary Examiner* — Seahvosh Nikmanesh
(74) *Attorney, Agent, or Firm* — Sughrue Mion, PLLC (57) ABSTRACT

A method of manufacturing a solid electrolytic capacitor including a porous anode body made of a valve metal having a dielectric film on a surface thereof, and a solid electrolyte layer disposed on a surface of the dielectric film. The method including: a step of; in a liquid including a polyanion and an aqueous medium, polymerizing a monomer compound to obtain a dispersion (1) containing a conjugated electrically conductive polymer and subjecting dispersion treatment to the dispersion (1) to obtain a dispersion (2) containing the conjugated electrically conductive polymer; depositing the dispersion (2) to a porous anode body made of a valve metal having a dielectric coating on a surface thereof; and removing the aqueous medium from the dispersion (2) deposited on the porous anode body to form a solid electrolyte layer, wherein an operation which pauses the dispersion treatment is performed.

15 Claims, 1 Drawing Sheet

(51) Int. Cl.
*H01G 9/025* (2006.01)
*H01G 9/048* (2006.01)
*H01G 9/15* (2006.01)

(52) U.S. Cl.
CPC ............ *H01G 9/15* (2013.01); *C08L 2201/50* (2013.01); *C08L 2203/20* (2013.01)

(56) References Cited

U.S. PATENT DOCUMENTS

| 2013/0037411 A1 | 2/2013 | Atobe et al. |
| 2014/0022703 A1* | 1/2014 | Petrzilek ................ H01G 9/028 361/525 |
| 2016/0055981 A1 | 2/2016 | Tagawa et al. |

FOREIGN PATENT DOCUMENTS

| JP | 2003-100561 A | 4/2003 |
| JP | 2005-109252 A | 4/2005 |
| JP | 2011-510141 A | 3/2011 |
| JP | 2013-55308 A | 3/2013 |
| JP | 2016-82052 A | 5/2016 |
| WO | 2009/131011 A1 | 10/2009 |
| WO | 2011/108254 A1 | 9/2011 |
| WO | 2014/163202 A1 | 10/2014 |

OTHER PUBLICATIONS

Written Opinion of the International Searching Authority dated Jun. 18, 2019 in International Application No. PCT/JP2019/013008.
Office Action dated Feb. 2, 2021 in Korean Application No. 10-2020-7029561.
Communication dated Feb. 26, 2021, from The China National Intellectual Property Administration in corresponding Application No. 201980023948.X.

* cited by examiner

| | Step (A) ▼Initiating dispersion treatment | ▼Pausing | ▼Resuming dispersion treatment | | | | ▼Viscosity ▼Measurement | | ▼Adding pure water (adjusting solid content concentration to 3.98%) | | |
|---|---|---|---|---|---|---|---|---|---|---|---|
| Examples 1, 4 to 6, 8 | 9 min | 10 min | 9 min | 10 min | 9 min | 10 min | 9 min | | 135 min | Demineralization by cation and anion exchange resins | Filtering through 5 μm and 3 μm filters | Adding pure water to adjust solid content concentration to 1.83% |
| Example 2 | Adjusting solid content concentration to 4.72% ▼Initiating dispersion treatment 9 min | 30 min | 9 min | 30 min | 9 min | 30 min | 9 min | ▼Viscosity ▼Measurement | | 180 min | | |
| Example 3 | ▼Initiating dispersion treatment 6 min | 10 min | 6 min | 10 min | 6 min | 10 min | 6 min | 10 min 3 min | | | | |
| Example 7 | ▼Initiating dispersion treatment after adding ammonium sulfate 9 min | 10 min | 9 min | 10 min | 9 min | 10 min | 9 min | | | | | |
| Comparative Examples 1 to 4 | 30 min | | | | | | 9 min | | | | | |

★ Total amount: 1500mL

★ Throughput of high-pressure homogenizer: 500mL/min

METHOD OF MANUFACTURING SOLID ELECTROLYTIC CAPACITOR, AND METHOD OF MANUFACTURING DISPERSION CONTAINING CONJUGATED ELECTRICALLY CONDUCTIVE POLYMER

CROSS REFERENCE TO RELATED APPLICATIONS

This application is a National Stage of International Application No. PCT/JP2019/013008 filed Mar. 26, 2019, claiming priority based on Japanese Patent Application No. 2018-068442 filed Mar. 30, 2018.

TECHNICAL FIELD

The present invention relates to a method of manufacturing a solid electrolytic capacitor, and a method of manufacturing a dispersion containing a conjugated electrically conductive polymer.

BACKGROUND ART

There has been proposed a solid electrolytic capacitor manufactured by forming a dielectric oxide film on a surface of a metal by anodization and bringing a solid electrolyte in contact with the film, wherein an electrically conductive polymer is used as the solid electrolyte.

As examples of the metals covered by a dielectric oxide film by anodization, aluminum, tantalum, and niobium are known.

In addition, as electrically conductive polymers used for a solid electrolytic capacitor, conjugated electrically conductive polymers such as polythiophene, polypyrrole, polyaniline, polyacetylene, polyphenylene, poly(p-phenylene-vinylene), polyacene, polythiophene vinylene, and derivatives thereof are known. In addition, a technique of doping a polyanion, such as polystyrene sulfonic acid, as a counter anion of the conjugated electrically conductive polymer to the conjugated electrically conductive polymer is known.

A typical method for forming a solid electrolyte includes a method of polymerizing a monomer compound solution and an oxidant solution by chemical oxidization or electrolytically polymerizing them on a dielectric oxide film formed on a surface of a metal having a valve function (valve metal). In addition, as a method for forming a solid electrolyte, there has been proposed a method of applying an aqueous solution or a suspension of an electrically conductive polymer to a valve metal on which a dielectric oxide film is formed.

For example, Patent Literature 1 discloses a method of manufacturing a solid electrolytic capacitor comprising a step of impregnating a capacitor element with an aqueous solution of an electrically conductive polymer in which fine particles of an electrically conductive polymer are dispersed, to form a first solid electrolyte layer, and a step of impregnating the surface of the first solid electrolyte layer with a solution containing a heterocyclic monomer and a solution containing an oxidant separately or with a mixed solution containing a heterocyclic monomer and an oxidant, to form a second solid electrolyte layer.

Patent Literature 2 discloses a method of manufacturing a solid electrolytic capacitor comprising a step of forming an electrically conductive polymer layer, as a solid electrolyte layer, by chemically polymerizing a polymerizable monomer, on a capacitor element wherein a dielectric oxide film is formed on a surface of a sintered body obtained by sintering valve metal powder, and a subsequent step of immersing the capacitor element in a solution of an electrically conductive polymer or applying a solution of an electrically conductive polymer to the capacitor element to be dried.

Patent Literature 3 proposes a process of polymerizing poly(3,4-ethylenedioxythiophene)-polystyrene sulfonic acid (PEDOT-PSS) by ultrasonic irradiation.

Patent Literature 4 discloses a step of polymerizing a monomer compound in a dispersion medium comprising the monomer compound and a seed particle forming a protective colloid by a polyanion to obtain a dispersion containing a conjugated electrically conductive polymer.

CITATION LIST

Patent Literature

Patent Literature 1: JP 2003-100561 A
Patent Literature 2: JP 2005-109252 A
Patent Literature 3: JP 2011-510141 A
Patent Literature 4: WO 2014/163202 A

SUMMARY OF INVENTION

Technical Problem

However, there is room to further improve the performance of a capacity development ratio (electrostatic capacity) and equivalent series resistance (ESR) in these conventional techniques.

An object of the present invention is to provide a solid electrolytic capacitor having a high capacity development ratio (electrostatic capacity) and low equivalent series resistance (ESR), and a method of manufacturing the same.

An additional object of the present invention is to provide a method of manufacturing a dispersion containing a conjugated electrically conductive polymer which is suitable for manufacturing a solid electrolytic capacitor having a high capacity development ratio (electrostatic capacity) and low equivalent series resistance (ESR).

Solution to Problem

As a result of intensive studies, the present inventors have found that the problem described above can be solved by pausing dispersion treatment for a dispersion containing a conjugated electrically conductive polymer and a polyanion in order to effectively perform deagglomeration of a complex formed by the conjugated electrically conductive polymer and the polyanion in the process of manufacturing a dispersion of the conjugated electrically conductive polymer used as a solid electrolyte of a solid electrolytic capacitor, and have accomplished the present invention.

In other words, the present invention relates to the method of manufacturing a solid electrolytic capacitor and the solid electrolytic capacitor described in [1] to [15] below, and the method of manufacturing a dispersion containing a conjugated electrically conductive polymer described in [16] below.

[1]

A method of manufacturing a solid electrolytic capacitor comprising a porous anode body made of a valve metal having a dielectric film on a surface thereof, and a solid electrolyte layer disposed on a surface of the dielectric film, the method comprising:

a step (A) of, in a liquid comprising a polyanion and an aqueous medium, polymerizing a monomer compound for obtaining a conjugated electrically conductive polymer to obtain a dispersion (1) containing a conjugated electrically conductive polymer and subjecting the dispersion (1) to a dispersion treatment to obtain a dispersion (2) containing the conjugated electrically conductive polymer;

a step (B) of depositing the dispersion (2) on a porous anode body made of a valve metal having a dielectric film on a surface thereof; and a step (C) of removing the aqueous medium from the dispersion (2) deposited to the porous anode body to form a solid electrolyte layer, wherein in the step (A), an operation which pauses the dispersion treatment is performed once or several times, and the pausing time is from 1 to 6000 minutes in total and is from 1 to 300 minutes per operation.

[2]

The method of manufacturing a solid electrolytic capacitor according to [1], wherein seed particles forming a protective colloid by a polyanion are dispersed in the aqueous medium.

[3]

The method of manufacturing a solid electrolytic capacitor according to [1] or [2], wherein the operation which pauses the dispersion treatment is performed from 2 to 20 times.

[4]

The method of manufacturing a solid electrolytic capacitor according to any of [1] to [3], wherein the time for which the dispersion treatment is paused is from 6 to 2250 minutes in total.

[5]

The method of manufacturing a solid electrolytic capacitor according to any of [1] to [4], wherein the viscosity of the dispersion (1) after the pause is from 1.05 to 100.0 times higher than a viscosity before the pause.

[6]

The method of manufacturing a solid electrolytic capacitor according to any of [1] to [5], wherein a salt compound is added to the dispersion (1) in the step (A).

[7]

The method of manufacturing a solid electrolytic capacitor according to any of [2] to [6], wherein the seed particles are particles of a polymer of an ethylenically unsaturated monomer.

[8]

The method of manufacturing a solid electrolytic capacitor according to any of [1] to [7], wherein the dispersion treatment comprises a dispersion treatment by ultrasonic irradiation in the step (A).

[9]

The method of manufacturing a solid electrolytic capacitor according to any of [1] to [8], wherein the dispersion treatment comprises a dispersion treatment by a high-pressure homogenizer in the step (A).

[10]

The method of manufacturing a solid electrolytic capacitor according to any of [1] to [9], wherein the monomer compound is at least one selected from the group consisting of a pyrrole compound, an aniline compound, and a thiophene compound.

[11]

The method of manufacturing a solid electrolytic capacitor according to any of [1] to [10], wherein the monomer compound is a compound represented by the following formula (1):

(wherein $R^1$ and $R^2$ each independently represent a hydrogen atom, a hydroxy group, an alkyl group which may have a substituent and in which the number of carbons in the part other than the substituent is from 1 to 18, an alkoxy group which may have a substituent and in which the number of carbons in the part other than the substituent is from 1 to 18, or an alkylthio group which may have a substituent and in which the number of carbons in the part other than the substituent is from 1 to 18, or $R^1$ and $R^2$ are bonded to each other and represent an alicycle which may have a substituent and in which the number of carbons in the part other than the substituent is from 3 to 10, an aromatic ring which may have a substituent and in which the number of carbons in the part other than the substituent is from 6 to 10, a heterocyclic ring containing an oxygen atom which may have a substituent and in which the number of carbons in the part other than the substituent is from 2 to 10, a heterocyclic ring containing a sulfur atom which may have a substituent and in which the number of carbons in the part other than the substituent is from 2 to 10, or a heterocyclic ring containing a sulfur atom and an oxygen atom which may have a substituent and the number of carbons in the part other than the substituent is from 2 to 10).

[12]

The method of manufacturing a solid electrolytic capacitor according to any of [1] to [11], wherein the polyanion is a polymer having at least one of a sulfo group and a group consisting of a salt of a sulfo group.

[13]

The method of manufacturing a solid electrolytic capacitor according to any of [1] to [12], wherein the polyanion is used in an amount such that the ratio of anionic groups in the polyanion is from 0.25 to 30.00 mol relative to 1 mol of the monomer compound.

[14]

The method of manufacturing a solid electrolytic capacitor according to any of [1] to [13], wherein the polymerization is performed using at least one oxidant selected from peroxodisulfuric acid and a salt thereof in the step (A).

[15]

A solid electrolytic capacitor obtained by the manufacturing method according to any of [1] to [14].

[16]

A method of manufacturing a dispersion (2) containing a conjugated electrically conductive polymer, comprising a step (A) of, in a liquid including a polyanion and an aqueous medium, polymerizing a monomer compound for obtaining a conjugated electrically conductive polymer to obtain a dispersion (1) containing the conjugated electrically conductive polymer and subjecting the dispersion (1) to a dispersion treatment to obtain a dispersion (2) containing the conjugated electrically conductive polymer, wherein in the step (A), an operation which pauses the dispersion treatment is performed once or several times, and the pausing time is from 1 to 6000 minutes in total and from 1 to 300 minutes per operation.

Advantageous Effects of Invention

The method of manufacturing a solid electrolytic capacitor according to the present invention can produce a solid electrolytic capacitor having a high capacity development ratio (electrostatic capacity) and low equivalent series resistance (ESR).

The solid electrolytic capacitor according to the present invention has a high capacity development ratio (electrostatic capacity) and low equivalent series resistance (ESR).

The method of manufacturing a dispersion according to the present invention can further produce a dispersion containing a conjugated electrically conductive polymer which is suitable for manufacturing a solid electrolytic capacitor having a high capacity development ratio (electrostatic capacity) and low equivalent series resistance (ESR).

DESCRIPTION OF EMBODIMENTS

Figure 1:
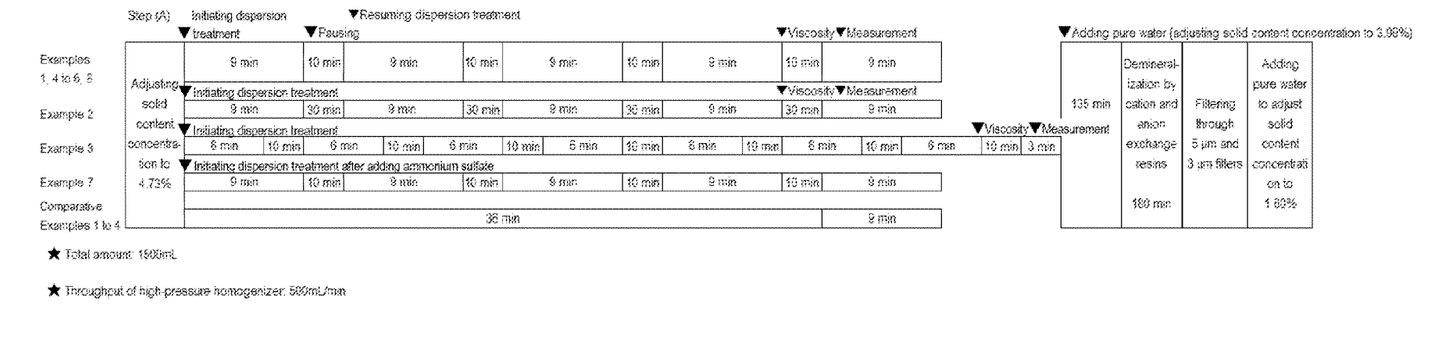
The FIGURE shows a schematic view of the step (A) in the examples.

The method of manufacturing a solid electrolytic capacitor of the present invention is a method of manufacturing a solid electrolytic capacitor comprising a porous anode body made of a valve metal having a dielectric film on a surface thereof, and a solid electrolyte layer disposed on a surface of the dielectric film, the method comprising:

a step (A) of, in a liquid comprising a polyanion and an aqueous medium, polymerizing a monomer compound for obtaining a conjugated electrically conductive polymer to obtain a dispersion (1) containing the conjugated electrically conductive polymer and subjecting the dispersion (1) to a dispersion treatment to obtain a dispersion (2) containing the conjugated electrically conductive polymer;

a step (B) of depositing the dispersion (2) on a porous anode body made of a valve metal having a dielectric film on a surface thereof; and a step (C) of removing the aqueous medium from the dispersion (2) deposited on the porous anode body to form a solid electrolyte layer, wherein in the step (A), an operation which pauses the dispersion treatment is performed once or several times, the pausing time is from 1 to 6000 minutes in total, and the pausing time per operation, which may be the same or different from each other, is from 1 to 300 minutes.

In the present specification, a polymer obtained by polymerizing a single monomer compound for obtaining a conjugated electrically conductive polymer, and a copolymer obtained by copolymerizing a plurality of the monomer compounds are both referred to as a "conjugated electrically conductive polymer".

In the present specification, a particle in which a polyanion is coordinated on the surface of a seed particle to form a protective colloid is referred to as a "seed particle forming a protective colloid by a polyanion". Note that a "polyanion" means a polymer having two or more anionic groups.

In the present specification, "(meth)acryl" means acryl or methacryl and "(meth)acrylate" means acrylate or methacrylate.

<Step (A) for Obtaining Dispersion (2) Containing Conjugated Electrically Conductive Polymer>
(Preparation of a Dispersion (1) Containing a Conjugated Electrically Conductive Polymer)

The step for obtaining a dispersion (1) containing a conjugated electrically conductive polymer is performed by polymerizing the monomer compound in a liquid including a polyanion and an aqueous medium. Examples of the more specific aspect of this liquid include:

(i) a liquid including the monomer compound, the polyanion, and the aqueous medium; and (ii) a liquid including the monomer compound, the seed particle forming a protective colloid by a polyanion, and the aqueous medium.

An additional polyanion (a polyanion further added separately from the polyanion used in the protective colloid of the seed particle; hereinafter may be referred to as a "free polyanion") may be included in the liquid (ii).

The dispersion (1) containing the conjugated electrically conductive polymer is a dispersion in which at least one complex selected from a complex of the conjugated electrically conductive polymer and the polyanion, and a complex of the conjugated electrically conductive polymer and the seed particle forming a protective colloid by a polyanion is dispersed in the aqueous medium. It is considered that the complex is formed by doping the polyanion to the conjugated electrically conductive polymer in the present step.

[Monomer Compound]

The monomer compound inducing the constitutional unit of the conjugated electrically conductive polymer is preferably one or more selected from a pyrrole compound (i.e., pyrrole which may have a substituent), an aniline compound (i.e., aniline which may have a substituent), and a thiophene compound (i.e., thiophene which may have a substituent). Examples of the substituent include, for example, an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may be substituted with one or more selected from a carboxy group, a hydroxy group, a halogen atom, and a cyano group. Two or more of the substituents may be fused to form a ring.

The specific examples of the monomer compound include pyrrole compounds such as pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxylpyrrole, 3-methyl-4-carboxylpyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, and 3-methyl-4-hexyloxypyrrole;

aniline compounds such as aniline, 2-methylaniline, 3-isobutylaniline, 2-aniline sulfonic acid, and 3-aniline sulfonic acid; and thiophene compounds such as thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butylenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, and 3,4-ethyleneoxythiathiophene.

The monomer compound can be used alone or in combination of two or more compounds.

Among the compounds, pyrrole, N-methylpyrrole, thiophene, 3-methylthiophene, 3-methoxythiophene, and 3,4-ethylenedioxythiophene are preferable in terms of obtaining a conjugated electrically conductive polymer with high conductivity.

The monomer compound comprises preferably a compound shown in the formula (1) below, more preferably a compound shown in the formula (2) below, and still more preferably 3,4-ethylenedioxythiophene among the compounds described above.

$R^1$ and $R^2$ in the formula (1) each independently represent a hydrogen atom, a hydroxy group, an alkyl group which may have a substituent and in which the number of carbons (not including the number of carbons in the substituent; hereinafter the same definition shall be applied) is from 1 to 18, an alkoxy group which may have a substituent and in which the number of carbons is from 1 to 18, or an alkylthio group which may have a substituent and in which the number of carbons is from 1 to 18. $R^1$ and $R^2$ bond together to form a ring and represent an alicycle which may have a substituent and in which the number of carbons is from 3 to 10, an aromatic ring which may have a substituent and in which the number of carbons is from 6 to 10, a heterocyclic ring containing an oxygen atom which may have a substituent and in which the number of carbons is from 2 to 10, a heterocyclic ring containing a sulfur atom which may have a substituent and in which the number of carbons is from 2 to 10, or a heterocyclic ring containing a sulfur atom and an oxygen atom which may have a substituent and in which the number of carbons is from 2 to 10. "$R^1$ and $R^2$ bond together to form a ring" means that "$R^1$ and $R^2$ are bonded to each other and form a ring together with the two carbon atoms in the thiophene skeleton in formula (1)", and the number of carbons in the ring formed by bonding $R^1$ and $R^2$ together includes the two carbon atoms in the thiophene skeleton.

Examples of the substituent include, for example, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may be substituted with a carboxy group, a hydroxy group, a halogen atom, or a cyano group. Two or more of the substituents may be fused to form a ring.

Examples of the heterocyclic ring containing an oxygen atom include, for example, an oxirane ring, an oxetane ring, a furan ring, a hydrofuran ring, a pyran ring, a pyrone ring, a dioxane ring, and a trioxane ring.

Examples of the heterocyclic ring containing a sulfur atom include, for example, a thiirane ring, a thietane ring, a thiophene ring, a thiane ring, a thiopyran ring, a thiopyrylium ring, a benzothiopyran ring, a dithiane ring, a dithiolane ring, and a trithiane ring.

Examples of the heterocyclic ring containing a sulfur atom and an oxygen atom include, for example, an oxathiolane ring and an oxathiane ring.

In the formula (2), $R^3$ and $R^4$ each independently represent a hydrogen atom or an alkyl group which may have a substituent and in which the number of carbons is from 1 to 4, or $R^3$ and $R^4$ are bonded to each other to form a ring and represent a heterocyclic ring containing an oxygen atom which may have a substituent and in which the number of carbons is from 3 to 6.

$R^3$ and $R^4$ are preferably bonded to each other to form a ring which is a heterocyclic ring containing an oxygen atom which may have a substituent and in which the number of carbons is from 3 to 6. "$R^3$ and $R^4$ are bonded to each other to form a ring" means that "$R^3$ and $R^4$ are bonded to each other and form a ring together with the adjacent two oxygen atoms and the two carbon atoms in the thiophene skeleton in the formula (2)", and the number of carbons in the ring formed by bonding $R^3$ and $R^4$ together includes the two carbon atoms in the thiophene skeleton.

Examples of the heterocyclic ring containing an oxygen atom include, for example, a dioxane ring and a trioxane ring, and a dioxane ring is preferable. Examples of the substituent include, for example, an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may be substituted with a carboxy group, a hydroxy group, a halogen atom, or a cyano group. Two or more of the substituents may be fused to form a ring.

[Conjugated Electrically Conductive Polymer]

The conjugated electrically conductive polymer is not particularly limited as long as the polymer is an organic polymer compound having a π conjugated system in its main chain. Examples of the conjugated electrically conductive polymer include, for example, polypyrroles, polythiophenes, polyisothianaphthenes, polyacetylenes, polyphenylenes, polyphenylenevinylenes, polyanilines, polyacenes, polythiophenevinylenes, and a copolymer comprising two or more of monomer units of polymers.

Among these conjugated electrically conductive polymers, polypyrrole, poly(N-methylpyrrole), polythiophene, poly(3-methylthiophene), poly(3-methoxythiophene), and poly(3,4-ethylenedioxythiophene) are preferable in terms of high conductivity. Poly(3,4-ethylenedioxythiophene) (PEDOT) is more preferable because of its high conductivity and excellent thermal resistance.

[Polyanion]

The polyanion is a polymer which has two or more monomer units having an anionic group, which is coordinated on the surface of a seed particle to form a protective colloid and functions as a dopant to the conjugated electrically conductive polymer.

Examples of the anionic group include a sulfo group or a group consisting of a salt thereof (a group formed by substituting the hydrogen atom in the sulfo group with a metal atom or the like, such as $SO_3Na$, $SO_3K$, and $SO_3(NH_4)$), a phosphate group or a group formed by a salt thereof (a group formed by substituting the hydrogen atom in the phosphate group with a metal atom or the like, such as $PO_4Na_2$, $PO_4NaH$, $PO_4K_2$, $PO_4KH$, $PO_4(NH_4)_2$, and $PO_4(NH_4)H$), a monosubstituted phosphate ester group, a carboxyl group or a group consisting of a salt thereof (a group formed by substituting the hydrogen atom in the carboxyl group with a metal atom or the like, such as COONa, COOK, and $COO(NH_4)$), and a monosubstituted sulfate ester group. Among them, a strong acid group is preferable, and a sulfo group or a group formed by a salt thereof, and a phosphate group or a group formed by a salt thereof are more preferable, and a sulfo group or a group formed by a salt thereof is further preferable.

The anionic group may bond to the main chain of the polymer directly, or may bond to the side chain of the polymer. When the anionic group bonds to the side chain, the doping effect is more notable. Therefore, the anionic group preferably bonds to the terminus of the side chain.

The polyanion may have a substituent other than the anionic group and/or a bonding structure. Examples of the substituent include an alkyl group, a hydroxy group, an alkoxy group, a cyano group, a phenyl group, a hydroxyphenyl group, a halogeno group, an alkenyl group, an amino group, an oxycarbonyl group, and a carbonyl group. Examples of the bonding structure include an ester bond, an imide bond, and an amide bond. Among them, an alkyl group, a hydroxy group, a cyano group, a hydroxyphenyl group, and an oxycarbonyl group are preferable, and an alkyl group, a hydroxy group, and a cyano group are more preferable. The substituent and/or the bonding structure may bond to the polymer main chain directly or may bond to the side chain. Since each substituent exhibits its effects when bonding to the side chain, the substituent preferably bonds to the terminus of the side chain.

The alkyl group which may be substituted in the polyanion is expected to have the effect of enhancing solubility and dispersibility in an aqueous medium, and compatibility with and dispersibility in a conjugated electrically conductive polymer. Examples of the alkyl group include a chain alkyl group such as a methyl group, an ethyl group, a propyl group, a butyl group, an isobutyl group, a t-butyl group, a pentyl group, a hexyl group, an octyl group, a decyl group, and a dodecyl group; and a cycloalkyl group such as a cyclopropyl group, a cyclopentyl group, and a cyclohexyl group. Considering the solubility in an aqueous medium, the dispersibility in a conjugated electrically conductive polymer, and the steric hindrance, an alkyl group having 1 to 12 carbon atoms is more preferable.

The hydroxy group which may be substituted in the polyanion is expected to have the effect of promoting the formation of a hydrogen bond with another hydrogen atom, and also enhancing solubility in an aqueous medium, compatibility with, dispersibility in, and adhesiveness to a conjugated electrically conductive polymer. The hydroxy group preferably bonds to the terminus of an alkyl group having 1 to 6 carbon atoms which is bonded to a polymer main chain.

The cyano group and the hydroxyphenyl group which may be substituted in the polyanion are expected to have an effect of enhancing compatibility with a conjugated electrically conductive polymer, solubility in an aqueous medium, and thermal resistance. The cyano group preferably bonds to the polymer main chain directly, bonds to the terminus of an alkyl group having 1 to 7 carbon atoms which bonds to a polymer main chain, or bonds to the terminus of an alkenyl group having 2 to 7 carbons atoms which bonds to a polymer main chain. The preferable hydroxyphenyl group is a 4-hydroxyphenyl group.

The oxycarbonyl group which may be substituted in the polyanion is preferably an alkyloxycarbonyl group or an aryloxycarbonyl group which bonds to a polymer main chain directly or through another functional group.

The composition of the polymer main chain of the polyanion is not particularly limited. Examples of the polymer main chain include polyalkylene, polyimide, polyamide, and polyester. Among them, polyalkylene is preferable in terms of easy synthesis and availability.

Polyalkylene is a polymer composed of repeating units of an ethylenically unsaturated monomer. Polyalkylene may have a carbon-carbon double bond in the main chain. Examples of polyalkylenes include polyethylene, polypropylene, polybutene, polypentene, polyhexene, polyvinyl alcohol, polyvinyl phenol, poly(3,3,3-trifluoropropylene), polyacrylonitrile, polyacrylate, polymethacrylate, polystyrene, polybutadiene, and polyisoprene.

Examples of polyimide include the one obtained by a polycondensation reaction of acid anhydride such as pyromellitic dianhydride, biphenyl tetracarboxylic dianhydride, benzophenone tetracarboxylic dianhydride, 2,2,3,3-tetracarboxydiphenyl ether dianhydride, or 2,2-[4,4'-di(dicarboxyphenyloxy)phenyl]propane dianhydride with diamine such as oxydianiline, p-phenylenediamine, m-phenylenediamine, or benzophenonediamine.

Examples of polyamide include polyamide 6, polyamide 6,6, and polyamide 6,10.

Examples of polyester include polyethylene terephthalate and polybutylene terephthalate.

The specific examples of a polymer having at least one of a sulfo group and a group consisting of a salt of a sulfo group suitably used as a polyanion include polyvinyl sulfonic acid, polystyrene sulfonic acid, polyallyl sulfonic acid, polyethyl acrylate sulfonic acid, polybutyl acrylate sulfonic acid, poly(2-acrylamido-2-methylpropane sulfonic acid), and polyisoprene sulfonic acid, and those in which all or a part of the sulfo group thereof is substituted with a group consisting of a salt of a sulfo group. These may be a homopolymer, or a copolymer comprising two or more monomeric units. Among them, the polymers are preferably polystyrene sulfonic acid, polyisoprene sulfonic acid, and polyethyl acrylate sulfonic acid, polybutyl acrylate sulfonic acid, and those in which all or a part of the sulfo group thereof is substituted with a group consisting of a salt of a sulfo group, and more preferably polystyrene sulfonic acid (PSS), and those in which all or a part of the sulfo group in polystyrene sulfonic acid is substituted with a group consisting of a salt of a sulfo group in terms of providing conductivity.

A polyanion, especially a polymer having at least one of a sulfo group and a group consisting of a salt of a sulfo group improves dispersibility of a monomer compound in an aqueous medium and additionally functions as a dopant for a conjugated electrically conductive polymer.

The weight average molecular weight of the polyanion is preferably from 1,000 to 1,000,000, more preferably from 5,000 to 500,000, and still more preferably from 50,000 to 300,000. The weight average molecular weight within this range improves solubility of the polyanion in an aqueous medium and doping of the polyanion to a conjugated electrically conductive polymer. The weight average molecular weight refers to a measured value obtained by gel permeation chromatography in terms of polystyrene.

A substance with the above-described characteristics being available on the market may be chosen as the polyanion, or the polyanion may be synthesized by a publicly known method. A method for synthesizing a polyanion is described in JP 2005-76016 A.

The amount of a polyanion, i.e., the total amount of a polyanion used for forming protective colloid seed particles, prepared before the initiation of the polymerization, and added during the polymerization is an amount such that the anionic group in the polyanion is preferably from 0.25 to 30 mol, more preferably from 0.5 to 28 mol, and still more preferably from 0.8 to 25 mol relative to 1 mol of the monomer compound.

The used amount of the polyanion relative to 100 parts by mass of the conjugated electrically conductive polymer manufactured in the present step is preferably from 10 to 30,000 parts by mass, more preferably from 30 to 20,000 parts by mass, and still more preferably from 50 to 15,000 parts by mass.

When the used amount of the polyanion is not less than 10 parts by mass, the conductivity of the electrically conductive polymer is appropriate. When the used amount of the polyanion is not more than 30,000 parts by mass, the electrically conductive polymer has good dispersibility in an aqueous medium.

[Seed Particle]

The seed particle which may be used in the present invention is a polymer particle forming a protective colloid by a polyanion in an aqueous medium. The preferable example of the seed particle is the one comprising a polymer comprising one or two or more ethylenically unsaturated monomers as a constitutional unit. The polymer may be a single kind or a mixture of two or more kinds, and may be crystalline or amorphous. When the polymer is crystalline, the polymer preferably has 50% crystallinity or less.

Crystallinity can be measured by a differential scanning calorimeter or X-ray diffraction apparatus.

The ethylenically unsaturated monomer is a monomer having one or more polymerizable ethylenic carbon-carbon double bonds. Examples of the ethylenically unsaturated monomer include (meth)acrylate having a linear, branched or cyclic alkyl chain; an aromatic vinyl compound such as styrene and $\alpha$-methyl styrene; a heterocyclic vinyl compound such as vinylpyrrolidone; hydroxyalkyl (meth)acrylate; dialkylaminoalkyl (meth)acrylate such as dimethylaminoethyl acrylate; a vinyl ester such as vinyl acetate and vinyl alkanoate; monoolefin such as ethylene, propylene, butylene, and isobutylene; a conjugated diolefin which may have a halogen atom, such as butadiene, isoprene, and chloroprene; $\alpha,\beta$-unsaturated mono- or dicarboxylic acid such as acrylic acid, methacrylic acid, crotonic acid, itaconic acid, maleic acid, and fumaric acid; a cyanated vinyl compound such as acrylonitrile; a carbonyl group-containing vinyl compound such as acrolein, and diacetonacrylamide. These ethylenically unsaturated monomers can be used alone or in combination of two or more monomers.

The ethylenically unsaturated monomer may be a crosslinkable monomer. The crosslinkable monomers or a combination of the crosslinkable monomer and an ethylenically unsaturated compound having an active hydrogen may be used to crosslink. The crosslinked copolymer can enhance water resistance, humidity resistance, heat resistance of a conductive film and the like. The "crosslinkable monomer" is a compound having two or more ethylenic carbon-carbon double bonds, or a compound having one or more ethylenic carbon-carbon double bonds and having one or more other reactive groups.

Examples of the crosslinkable monomers include an epoxy group-containing $\alpha,\beta$-ethylenically unsaturated compound such as glycidyl (meth)acrylate; a hydrolyzable alkoxysilyl group-containing $\alpha,\beta$-ethylenically unsaturated compound such as vinyltriethoxysilane, and $\gamma$-methacryloxypropyltrimethoxylsilane; a multifunctional vinyl compound such as ethylene glycol di(meth)acrylate, trimethylolpropane tri(meth)acrylate, allyl (meth)acrylate, divinyl benzene, and diallyl phthalate.

The crosslinkable monomer such as a carbonyl group-containing $\alpha,\beta$-ethylenically unsaturated compound (containing a ketone group) may be used to crosslink in combination with a polyhydrazine compound (in particular, a compound having two or more hydrazide groups, such as oxalic acid dihydrazide, succinic acid dihydrazide, adipic acid dihydrazide, and polyacrylic acid hydrazide).

The content of the crosslinkable monomer in the ethylenically unsaturated monomer is preferably not more than 50 mass %, more preferably not more than 35 mass %, and still more preferably not more than 25 mass %.

(Production of a Seed Particle Forming Protective Colloid by Polyanion)

A seed particle forms a protective colloid by a polyanion in an aqueous medium. A dispersion, in which the seed particles forming a protective colloid are dispersed in the aqueous medium, can be produced as a resin emulsion.

The polymerization reaction of the ethylenically unsaturated monomer when producing a resin emulsion is a radical polymerization reaction, and is conducted by either a batch method, a semi-continuous method, or a continuous method using a normal-pressure reactor or a pressure-resistant reactor. In addition, in terms of reaction stability and uniformity of the polymers during the polymerization, it is preferable to add, continuously or intermittently, a solution of the ethylenically unsaturated monomer in which the ethylenically unsaturated monomer is dissolved, emulsified, or dispersed in an aqueous medium to a polyanion-containing liquid in which a polyanion is dissolved in an aqueous medium in advance, to polymerize the ethylenically unsaturated monomer.

The reaction temperature is, though it depends on the decomposition temperature of the initiator, typically from 10 to 100° C. and usually from 30 to 90° C. The reaction time is not particularly limited and can be appropriately adjusted depending on the used amount of each component, the type of the initiator, the reaction temperature, etc.

During radical polymerization, the polyanion which is a protective colloid contributes to the stability of the emulsion particles. Emulsifiers such as an anionic emulsifier, a nonionic emulsifier and a reactive emulsifier, an aliphatic amine or the like may be added to the polymerization system as necessary. The type and used amount of the emulsifier and the aliphatic amine can be appropriately adjusted depending on various conditions such as the used amount of the polyanion and the composition of the ethylenically unsaturated monomer.

Examples of the emulsifier used in such a radical polymerization reaction include an anionic emulsifier such as alkylsulfonic acid ester salt, alkylbenzene sulfonate, alkylsulfo succinate, alkyldiphenlyeter disulfonate, polyoxyalkylene alkylsulfate, and polyoxyalkylene alkylphosphate ester, and a nonionic surfactant such as polyoxyalkylene alkyl ether, polyoxyalkylene alkylphenol ether, polyoxyalkylene fatty acid ester, and polyoxyalkylene sorbitan fatty acid ester.

Examples of the aliphatic amine include a primary amine such as octylamine, laurylamine, myristylamine, stearylamine, and oleylamine, a secondary amine such as dioctylamine, dilaurylamine, distearylamine, and dioleylamine, and a tertiary amine such as N,N-dimethyl laurylamine, N,N-dimethyl myristylamine, N,N-dimethyl palmitylamine, N,N-dimethyl stearylamine, N,N-dimethyl behenylamine, N,N-dimethyl oleylamine, N-methyl didecylamine, and N-methyl dioleylamine.

The emulsifier and the aliphatic amine may be used alone or in combination of two or more compounds.

In addition, when conducting the polymerization reaction of the ethylenically unsaturated monomer described above, a water-soluble polymer such as polyvinyl alcohol, methyl cellulose, carboxymethyl cellulose, hydroxethyl cellulose, hydroxypropyl cellulose, and polyvinyl pyrrolidone may exist in the aqueous medium as long as the properties of the conjugated electrically conductive polymer to be obtained are not impaired.

Examples of the aqueous medium used in manufacturing the dispersion of the seed particles include water or a mixed solvent of water and a water-soluble solvent. The ratio of the water-soluble solvent in the mixed solvent is preferably from 0 to 30 mass %. A ratio of the water-soluble solvent of 30 mass % or less can stabilize the polymerization reaction of the resin emulsion. Examples of the water-soluble solvent include alcohols such as methanol, ethanol, and isopropyl alcohol; ketones such as acetone; glycols such as ethylene glycol and propylene glycol; ethers such as ethylene glycol monomethyl ether and ethylene glycol monobutyl ether.

Publicly known and commonly used polymerization initiators can be used as a polymerization initiator of radical polymerization. Examples of the polymerization initiator include inorganic peroxides such as hydrogen peroxide, persulfuric acid, ammonium persulfate, potassium persulfate, and sodium persulfate; organic peroxides such as benzoyl peroxide, and t-butyl hydroperoxide; azo compounds such as 2,2'-azobisisobutyronitrile, and 4,4'-azobis (4-cyanovaleric acid). In addition, these polymerization initiators can be combined with sodium sulfoxylate formaldehyde, ascorbic acids, sulfites, tartaric acids and salts thereof, or iron (II) sulfate for redox polymerization as necessary. In addition, chain transfer agents such as alcohols and mercaptans may be used as necessary.

The amount of the ethylenically unsaturated monomer used in manufacturing the seed particle forming a protective colloid is preferably from 10 to 100 parts by mass, more preferably from 20 to 80 parts by mass, still more preferably from 30 to 70 parts by mass, relative to 100 parts by mass of the polyanion. When the used amount of the ethylenically unsaturated monomer is not less than 10 parts by mass, the ratio of the electrically conductive polymer comprising the seed particle forming a protective colloid by a polyanion in the conjugated electrically conductive polymer is appropriate, thereby enabling the suppression of thickening during the polymerization. When the used amount of the ethylenically unsaturated monomer is not more than 100 parts by mass, good stability of the seed particles forming a protective colloid is achieved.

d50 (50% median size in volume basis) of the particle size of the seed particles forming a protective colloid and being dispersed in an aqueous medium is preferably from 0.01 to 10 µm, more preferably from 0.05 to 1 µm, and still more preferably from 0.1 to 0.8 µm. The distribution of the particle size of the seed particle can be measured by a MicroTruck UPA-type particle size distribution measurement apparatus manufactured by NIKKISO CO., LTD. When d50 of the particle size of the seed particles dispersed in an aqueous medium is not less than 0.01 µm, good dispersibility of the seed particles is achieved, and when d50 is not more than 10 µm, the particles are hardly precipitated.

<Polymerization of Monomer Compound>

Polymerization of the monomer compound is performed in a liquid including the monomer compound, a polyanion, and an aqueous medium. Examples of the more specific aspect of this liquid include:

(i) a liquid including the monomer compound, the polyanion, and the aqueous medium; and (ii) a liquid including the monomer compound, the seed particle forming a protective colloid by a polyanion, and the aqueous medium.

[Monomer Compound Liquid]

A dispersion containing the monomer compound and the polyanion, or a dispersion containing the monomer compound and the seed particle forming a protective colloid by a polyanion (hereinafter they are inclusively and simply referred to as "monomer compound liquid") is prepared in order to polymerize the monomer compound in the liquid described above.

Any monomer compound liquid is acceptable as long as the monomer compound is dissolved, emulsified, or dispersed, and in order to satisfy this condition, a strong stirring apparatus such as a homogenizer, or an ultrasonic irradiation apparatus is generally used. For example, in the case of emulsification by ultrasonic irradiation, ultrasonic irradiation energy is not particularly limited as long as a homogeneous monomer compound liquid is obtained. Ultrasonic irradiation is preferably performed at a power consumption from 5 to 500 W/L for an exposure time from 0.1 to 2 hours/L.

When the dispersion containing the monomer compound and the seed particle forming a protective colloid by a polyanion is used as the monomer compound liquid, the same polyanion as that which is used for forming the protective colloid of the seed particle (i.e., the free polyanion) is preferably included in the monomer compound liquid in terms of suppressing agglomeration of the conjugated electrically conductive polymer produced by polymerization. This polyanion (i.e., the free polyanion) can be included by adding it to the monomer compound liquid and then dissolving, emulsifying, or dispersing it in the liquid. When the free polyanion is included in the monomer compound liquid, the amount is preferably from 5 to 99 mass %, more preferably from 10 to 90 mass %, still more preferably from 20 to 80 mass % based on the total amount of the polyanion used (i.e., the overall amount of the polyanion used for forming the protective colloid seed particles and the free polyanion).

[Aqueous Medium]

The aqueous medium used for the polymerization of the monomer compound is not particularly limited as long as a complex of the conjugated electrically conductive polymer and the seed particle forming a protective colloid by a polyanion, a complex of the conjugated electrically conductive polymer and the polyanion, or a complex of these two complexes can be dispersed in the aqueous medium. However, the aqueous medium is preferably the same type as the one used for the dispersion of the seed particle.

Examples of the aqueous medium used for the polymerization of the monomer compound include water, or a mixed solvent of water and a water-soluble solvent.

Examples of the water-soluble solvent include amides such as N-vinylpyrrolidone, hexamethyl phosphortriamide, N-vinylformamide, and N-vinylacetamide; phenols such as cresol, phenol, and xylenol; monohydric alcohols such as methanol, ethanol, and isopropyl alcohol; polyhydric alcohols such as ethylene glycol, propylene glycol, dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; ketones such as acetone; carbonate compounds such as ethylene carbonate, and propylene carbonate; ethers such as dioxane, diethyl ether, propylene glycol dialkyl ether, polyethylene glycol dialkyl ether, polypropylene glycol dialkyl ether, ethylene glycol monomethyl ether, and ethylene glycol monobutyl ether; heterocyclic compounds such as 3-methyl-2-oxazolidinone; nitriles such as acetonitrile, glutarodinitrile, methoxyacetonitrile, propionitrile, and benzonitrile. These solvents can be used alone or in combination of two or more compounds.

The ratio of the water-soluble solvent in the aqueous medium is preferably from 0 to 30 mass %. The aqueous medium preferably comprises not less than 50 mass % of water, and still more preferably comprises water alone. When the ratio of the water-soluble solvent is not more than 30 mass %, the aqueous medium can stabilize the polymerization reaction of the monomer compound.

The used amount of the aqueous medium is preferably from 10 to 50,000 parts by mass, and more preferably from 50 to 10,000 parts by mass, based on the total 100 parts by mass of the monomer compound, the seed particle forming a protective colloid by a polyanion, and a polyanion not contributing to forming the protective colloid. When the used amount of the aqueous medium is not less than 10 parts by mass, the viscosity of the dispersion during the polymerization is appropriate, and when the used amount of the aqueous medium is not more than 50,000 parts by mass, good performance of the solid electrolytic capacitor is achieved.

[Oxidant]

For example, when producing a dispersion containing a polypyrrole or a polythiophene as the conjugated electrically conductive polymer in the polymerization of the monomer compound, the polymerization is initiated by setting the monomer compound liquid to a predetermined temperature in the presence of an oxidant.

Examples of the oxidant include peroxodisulfates such as peroxodisulfuric acid, ammonium peroxodisulfate, sodium peroxodisulfate, and potassium peroxodisulfate; metal halides such as boron trifluoride; transition metal compounds such as ferric chloride, ferric sulfate, and cupric chloride; metal oxides such as silver oxide and cesium oxide; peroxides such as hydrogen peroxide and ozone; organic peroxides such as benzoyl peroxide; and oxygen. Among them, peroxodisulfuric acid and peroxodisulfate are preferable and peroxodisulfate is more preferable.

The oxidant described above can be used alone, or in combination of two or more compounds.

[Polymerization Temperature]

The temperature during the polymerization of the monomer compound is usually from 5 to 80° C., preferably from 10 to 60° C., more preferably from 15 to 40° C. By setting the temperature during the polymerization within this range, the polymerization can be performed at an appropriate reaction rate, an increase in the viscosity of the reaction liquid can be suppressed, the dispersion containing the conjugated electrically conductive polymer can be produced stably in an economical time period, and the conductivity of the obtained conjugated electrically conductive polymer tends to increase. The temperature during the polymerization can be controlled using a known heater or cooler. In addition, polymerization can be performed by varying the temperature within the range described above, if necessary.

[Addition of Dispersion of Seed Particles Forming a Protective Colloid]

It is preferred that the dispersion of the seed particles forming a protective colloid by a polyanion is further added to the reaction liquid during the polymerization of the monomer compound using the dispersion containing the monomer compound and the seed particles forming a protective colloid. Further adding a predetermined amount of the dispersion of the seed particles forming a protective colloid during the polymerization of the monomer compound can suppress the thickening of the reaction liquid during the polymerization, improve the stirring and mixing efficiency, and decrease the load of the manufacturing apparatus. The amount of the dispersion of the seed particles forming a protective colloid, which is added during the polymerization, is preferably from 10 to 90 mass %, more preferably from 20 to 80 mass %, and still more preferably from 30 to 70 mass % based on the total amount of the dispersion of the seed particles forming a protective colloid that are used.

[Addition of Polyanion]

The polyanion may further be added to the reaction liquid during the polymerization of the monomer compound. Further adding a part of a predetermined amount of the polyanion during the polymerization of the monomer compound can suppress the thickening of the reaction liquid during the polymerization, improve the stirring and mixing efficiency, and decrease the load of the manufacturing apparatus. The amount of the polyanion added during the polymerization is preferably from 0 to 90 mass %, more preferably from 20 to 80 mass %, and still more preferably from 30 to 70 mass % based on the total amount of the polyanion used.

(Preparation of Dispersion (2) Containing Conjugated Electrically Conductive Polymer)

A dispersion (2) containing the conjugated electrically conductive polymer (hereinafter also referred to as a "dispersion (2) containing a conjugated electrically conductive polymer") is obtained by preparing the dispersion (1) containing the conjugated electrically conductive polymer as described above, as well as subjecting the dispersion (1) to a dispersion treatment in the step (A).

A dispersion obtained by mixing two or more dispersions (1) containing different conjugated electrically conductive polymers may be subjected to a dispersion treatment.

The dispersion (1) containing the conjugated electrically conductive polymer is a dispersion in which at least one selected from (i) the complex of the conjugated electrically conductive polymer and the polyanion, and (ii) the complex of the conjugated electrically conductive polymer and the seed particle forming a protective colloid by a polyanion is dispersed in the aqueous medium.

The complex may agglomerate with the progress of the polymerization of the polymerizable compound.

In order to improve the electrostatic capacity and ESR of a solid electrolytic capacitor (i.e., in order to enlarge the electrostatic capacity of a solid electrolytic capacitor and decrease the ESR thereof), it is necessary to improve an impregnation property in a porous anode body. Therefore, in the present invention, the complex is disintegrated in the step (A) to achieve a state in which particulates with 1 to 10 µm of the average particle size are dispersed.

[Dispersion Treatment]

The dispersion treatment is a treatment for disintegrating the complex into a size of the fine particulates described above, and it is preferably performed with a strong stirring apparatus such as a homogenizer, or by ultrasonic irradiation. The dispersion treatment may be performed during the polymerization of the polymerizable compound. In other words, the dispersion (1) to be subjected to a dispersion treatment may include an unreacted polymerizable compound. For example, patent literature JP-A 2007-332183 describes a method for polymerizing a conjugated electrically conductive polymer by agitating it with a shear speed of not less than 5,000 $s^{-1}$.

In the case of ultrasonic irradiation, the treatment is preferably performed with a power consumption from 5 to 500 W/L per dispersion treatment liquid. The dispersion treatment may be performed either in a flow mode or a batch mode.

When using a high-pressure homogenizer, the pressure of the high-pressure homogenizer is preferably from 10 to 2000 bar, more preferably from 20 to 1500 bar, and still more preferably from 50 to 1000 bar. When the pressure of the high-pressure homogenizer is not less than 10 bar, the dispersion treatment can be performed efficiently, and the solid electrolytic capacitor exhibits a good performance. When the pressure of the high-pressure homogenizer is not more than 2000 bar, the workability during the dispersion treatment will be good.

For example, when 1500 mL of the dispersion is subjected to a dispersion treatment using a high-pressure homogenizer having a dispersion treatment throughput of 500 mL/min, it will take three minutes to perform a single dispersion treatment of the whole amount of the dispersion. The dispersion treatment time is preferably from 15 to 900 minutes, more preferably from 30 to 600 minutes, and still more preferably from 60 to 300 minutes in total. When the dispersion treatment time using the high-pressure homogenizer is not less than 15 minutes, the effect of the dispersion treatment occurs, and the solid electrolytic capacitor will exhibit a good performance. When the dispersion treatment time using the high-pressure homogenizer is not more than 900 minutes, the efficiency of the dispersion treatment will be good.

The dispersion treatment is paused for 1 to 6000 minutes, more preferably for 6 to 2250 minutes, and still more preferably for 20 to 750 minutes in total. If the dispersion treatment is paused for not less than two minutes in total, the solid electrolytic capacitor will exhibit a good performance. If the dispersion treatment pauses for not more than 6000 minutes, the workability will be good.

[Concentration of Dispersion]

The concentration of the conjugated electrically conductive polymer in the dispersion (1) when performing a dispersion treatment is not particularly limited as long as it does not impair the productivity in the dispersion treatment. However, the finished concentration, i.e., the concentration of the conjugated electrically conductive polymer in the dispersion (2) obtained by the step (A) is preferably from 1.0 to 10.0 mass % in terms of the impregnation property in the solid electrolytic capacitor. When the concentration is not less than 1.0 mass %, the ESR of the solid electrolytic capacitor will be good (i.e., the ESR could be lowered). When the concentration is not more than 10.0 mass %, the electrostatic capacity will be good (i.e., the electrostatic capacity will be higher).

The concentration of the conjugated electrically conductive polymer in the dispersion (1) may be decreased by diluting the dispersion with an aqueous medium. The timing of the dilution may be before the dispersion treatment, during the dispersion treatment, or after the dispersion treatment. However, it is preferable to perform the dilution during the dispersion treatment. Diluting the dispersion with an aqueous medium during the dispersion treatment makes it possible to perform the dispersion treatment efficiently in high concentration and reduce the influence of reagglomeration by dilution.

<Pausing of Dispersion Treatment>

The operation to pause the dispersion treatment is performed one or more times for 1 to 6000 minutes in total, in the step (A).

[Pausing of Dispersion Treatment]

Pausing the dispersion treatment and allowing the dispersion (1) to stand produces the dispersed complex and/or the disintegrated substance thereof (hereinafter also referred to as "complexes") to agglomerate and causes the dispersion (1) to thicken. Performing the dispersion treatment again after thickening makes it possible to promote deagglomeration of the complexes.

Though the detailed cause of the improvement of the electrostatic capacity and ESR of the solid electrolytic capacitor by enhancing deagglomeration of the complexes (i.e., the reason why the electrostatic capacity increases and the ESR decreases) is unknown, it is presumed that a change of the ratio of the presence of the conjugated electrically conductive polymer on the surface of the complexes occurs.

The operation to pause the dispersion treatment may be performed once or several times. The operation is preferably performed from 2 to 20 times, more preferably from 3 to 15 times, and still more preferably from 4 to 10 times.

The duration of pausing per operation is preferably from 1 to 300 minutes, more preferably from 2 to 150 minutes, and still more preferably from 5 to 75 minutes. If the dispersion treatment is paused for not less than one minute, the dispersion treatment will be efficiently performed and will produce a solid electrolytic capacitor with a good performance.

If the dispersion treatment is paused for not more than 300 minutes, the workability during the dispersion treatment will be good.

The viscosity of the thickened dispersion (for example, the viscosity when the pausing is finished) has preferably from 1.05 to 100.0 times higher viscosity, more preferably from 1.10 to 50.0 times higher viscosity, more preferably from 1.50 to 50.0 times higher viscosity, and still more preferably from 3.00 to 50.0 times higher viscosity than the viscosity before thickening (for example, the viscosity when the pausing is initiated). The upper limit may be, for example, 15 times higher. The viscosity of the thickened dispersion which is 1.05 times or more higher than the viscosity before thickening makes it possible that the deagglomeration of the conjugated electrically conductive polymer is performed efficiently, and the solid electrolytic capacitor exhibits a good performance. The viscosity of the thickened dispersion which is 100.0 times or less higher than the viscosity before thickening leads to good efficiency of the dispersion treatment.

[Addition of Salt Compound]

A salt compound can be added to the aqueous medium in the step (A). Addition of the salt compound makes it possible to increase the ionic strength of the dispersion, agglomerate the dispersed complex, and further thicken the dispersion (1).

The timing to add the salt compound is not particularly limited. However, in order to ensure uniformity, the salt compound is preferably added while stirring during the polymerization of the monomer compound, or during the dispersion treatment of the dispersion (1). When performing demineralization as described later, the salt compound may be added again after the demineralization to be dispersed. A salt compound is preferably added during the dispersion treatment of the dispersion (1), more preferably until 10 minutes before the completion of the dispersion treatment.

The salt compound is not particularly limited as long as it is a compound being dissolved in an aqueous medium, increasing the ionic strength of the dispersion, and thickening the dispersion.

For example, the salt compound is preferably at least one salt compound selected from an inorganic salt and an organic salt which is dissolved in an aqueous medium, increases the ionic strength of the dispersion, and thickens the dispersion.

Examples of the organic salt include citrate, lactate, glycolate, gluconate, acetate, propionate, fumarate, oxalate, and tartrate, and more specifically include salts such as calcium acetate and magnesium acetate, but are not limited thereto.

Examples of the inorganic salt include hydrochloride, carbonate, bicarbonate, sulfate, hydrogenphosphate, and phosphate, and more specifically include aluminum chloride, sodium nitrate, magnesium sulfate, aluminum sulfate, ammonium sulfate, potassium sulfate, and sodium sulfate, but not limited thereto. These salt compounds can be used alone, or in combination of two or more compounds.

The added amount is preferably from 0.01 to 30 mass %, more preferably from 0.01 to 15 mass %, and still more preferably from 0.01 to 5 mass % relative to the total amount (100 mass %) of the dispersion (2). The added amount of not less than 0.01 mass % makes the thickening of the dispersion (1) sufficient, and the added amount of not more than 30 mass % leads to good efficiency of the dispersion treatment.

[Additive]

Various additives can be added to the dispersion (1) containing the conjugated electrically conductive polymer as necessary. The additive is not particularly limited as long as it is an additive which may be mixed with the conjugated electrically conductive polymer, the seed particle forming a protective colloid by a polyanion, and the polyanion.

Examples of the additive include, for example, a neutralizer, a water-soluble polymer compound, a water-dispersible compound, an alkaline compound, a surfactant, an antifoaming agent, a coupling agent, an antioxidant, and an electrical conductivity improving agent. These additives can be used alone or in combination of two or more additives.

The water-soluble polymer compound is a water-soluble polymer having a cationic group or a nonionic group on the main chain or side chain of the polymer. The specific examples of the water-soluble polymer compound include polyoxyalkylene, water-soluble polyurethane, water-soluble polyester, water-soluble polyamide, water-soluble polyimide, water-soluble polyacryl, water-soluble polyacrylamide, polyvinyl alcohol, and polyacrylic acid. Polyoxyalkylene is preferred among them.

The specific examples of polyoxyalkylene include diethylene glycol, triethylene glycol, oligopolyethylene glycol, triethylene glycol monochlorhydrin, diethylene glycol monochlorhydrin, oligoethylene glycol monochlorhydrin, triethylene glycol monobromhydrin, diethylene glycol monobromhydrin, oligoethylene glycol monobromhydrin, polyethylene glycol, glycidyl ethers, polyethylene glycol glycidyl ethers, polyethylene oxide, triethylene glycol dimethyl ether, tetraethylene glycol dimethyl ether, diethylene glycol dimethyl ether, diethylene glycol diethyl ether diethylene glycol dibutyl ether, dipropylene glycol, tripropylene glycol, polypropylene glycol, polypropylene dioxide, polyoxyethylene alkyl ether, polyoxyethylene glycerin fatty acid ester, and polyoxyethylene fatty acid amide.

Examples of the water-dispersible compound include a compound in which a part of a low-hydrophilic compound is substituted with a high-hydrophilic functional group, or a compound in which a compound having a high-hydrophilic functional group is adsorbed around a low-hydrophilic compound (for example, emulsion), wherein the compound is dispersed without being precipitated in water. Specific examples include polyester, polyurethane, acrylic resin, silicone resin, and emulsions of these polymers. In addition, it includes a block copolymer or a graft copolymer of acrylic resin and other copolymer(s) such as polyester or polyurethane.

The water-soluble polymer compound and the water-dispersible compound can be used alone or in combination of two or more compounds. Addition of a water-soluble polymer compound and a water-dispersible compound makes it possible to adjust the viscosity of the dispersion containing the electrically conductive polymer and improve coating properties.

The used amount of the water-soluble polymer compound and the water-dispersible compound is preferably from 10 to 100,000 parts by mass, more preferably from 25 to 50,000 parts by mass, and still more preferably from 50 to 20,000 parts by mass based on the total of 100 parts by mass of the conjugated electrically conductive polymer and the seed particle forming a protective colloid by a polyanion. The amount of the water-soluble polymer compound and the water-dispersible compound ranging from 10 to 100,000 parts by mass makes it possible to achieve appropriate conductivity, and obtain good equivalent series resistance (ESR) of a solid electrolytic capacitor (i.e., decrease ESR).

Known inorganic alkaline compounds and organic alkaline compounds can be used as the alkaline compound. Examples of the inorganic alkaline compounds include ammonia, sodium hydroxide, potassium hydroxide, calcium hydroxide, and ammonia. Examples of the organic alkaline compounds include compounds such as aromatic amines, aliphatic amines, and alkali metal alkoxides. Addition of the alkaline compound makes it possible to provide corrosion resistance to an article on which the dispersion is applied, and to adjust the pH of the dispersion containing the conjugated electrically conductive polymer.

Among the aromatic amines, a nitrogen-containing heteroaryl ring compound is preferred. The nitrogen-containing heteroaryl ring compound is a nitrogen-containing hetero ring compound exhibiting aromaticity. A nitrogen atom included in the hetero ring has a conjugated relation with other atom(s) in the aromatic amines.

Examples of the nitrogen-containing heteroaryl ring compound include pyridines, imidazoles, pyrimidines, pyrazines, and triazines. Pyridines, imidazoles, and pyrimidines are preferred among them in terms of solvent solubility.

Examples of the aliphatic amines include, for example, ethyl morpholine, ethylamine, n-octylamine, diethylamine, diisobutylamine, methylethylamine, trimethylamine, triethylamine, allylamine, 2-ethylamino ethanol, 2,2'-imino diethanol, and N-ethylethylene diamine.

Examples of the alkali metal alkoxides include sodium alkoxides such as sodium methoxide and sodium ethoxide, and potassium alkoxides, and calcium alkoxides.

Examples of the surfactants include anionic surfactants such as carboxylate, sulfonate, sulfuric ester salt, and phosphoric ester salt; cationic surfactants such as amine salt and quaternary ammonium salt; amphoteric surfactants such as carboxy betaine, aminocarboxylate, and imidazolium betaine; and non-ionic surfactants such as polyoxyethylene alkyl ether, polyoxyethylene glycerin fatty acid ester, ethyleneglycol fatty acid ester, and polyoxyethylene fatty acid amide.

Examples of the antifoaming agents include, for example, silicone resin, polydimethylsiloxane, and silicone resin.

Examples of the antioxidants include, for example, phenolic antioxidant, amine antioxidant, phosphorus antioxidant, sulfur antioxidant, sugars, and vitamins.

The electrical conductivity improving agent is not particularly limited as long as it improves the electrical conductivity of the dispersion containing the electrically conductive polymer. Examples of the electrical conductivity improving agent include compounds having an ether bond, such as tetrahydrofuran; compounds having a lactone group, such as γ-butyrolactone and γ-valerolactone; compounds having an amide group or a lactam group, such as caprolactam, N-methylcaprolactam, N,N-dimethylacetamide, N-methylacetamide, N,N-dimethylformamide, N-methylformamide, N-methylformanilide, N-methylpyrrolidone, N-octylpyrrolidone, and pyrrolidone; sulfonated compounds or sulfoxide compounds such as tetramethylene sulfone and dimethyl sulfoxide; sugars or sugar derivatives such as sucrose, glucose, fructose and lactose; sugar alcohols such as sorbitol and mannitol; imides such as succinimide and maleimide; furan derivatives such as 2-furoic acid and 3-furoic acid; dialcohols or polyalcohols such as ethylene glycol, propylene glycol, glycerin, diethylene glycol, and triethylene glycol. Among them, tetrahydrofuran, N-methylformamide, N-methylpyrrolidone, ethylene glycol, propylene glycol, glycerin, dimethyl sulfoxide, and sorbitol are preferable, and ethylene glycol, diethylene glycol, triethylene glycol, propylene glycol, and glycerin are especially preferable in terms of improvement of electrical conductivity. The electric conductivity improving agent can be used alone, or in combination of two or more compounds.

[Demineralization]

When the dispersion (1) comprises a salt, the dispersion (1) may be demineralized after completion of the dispersion treatment. The complex of the conjugated electrically conductive polymer and the polyanion dispersed to primary particles in the step (A) can keep dispersibility by demineralization even when left standing still.

The method of demineralization is not particularly limited, and demineralization can be performed by a dialysis method, a centrifugal washing method, and an ion exchange method.

<Step (B) of Depositing Dispersion (2) Containing Conjugated Electrically Conductive Polymer on Porous Anode Body>

The method of manufacturing the solid electrolytic capacitor according to the present invention comprises a step (B) of depositing the dispersion (2) containing the conjugated electrically conductive polymer obtained in the step (A) on the surface of a porous anode body having an anode body made of a valve metal and a dielectric film formed on at least a portion of the surface of the anode body.

The electrode of the solid electrolytic capacitor according to the present invention can be a porous electrode formed by sintering powder of a valve metal having a large surface area, or a porous film obtained by etching a foil of a valve metal.

Examples of valve metals include metals such as aluminum (Al), beryllium (Be), bismuth (Bi), magnesium (Mg), germanium (Ge), hafnium (Hf), niobium (Nb), antimony (Sb), silicon (Si), tin (Sn), tantalum (Ta), titanium (Ti), vanadium (V), tungsten (W), and zirconium (Zr), and a metal alloy or compound of at least one of these metals and other element(s). An electrode material made of a valve metal of Al, Nb, or Ta is especially preferred.

The porous electrode made of a valve metal, for example, forms a dielectric oxide film on the surface by anodization to be a porous anode body.

The porous electrode described above can be, for example, anodized by applying voltage in a phosphorous acid solution to form a dielectric oxide film on the surface of the porous electrode. The value of the formation voltage can be decided based on the thickness of the dielectric oxide film and withstand the voltage of the capacitor. The preferable formation voltage is from 1 to 800 V, and more preferably from 1 to 300 V.

The dispersion (2) containing a conjugated electrically conductive polymer is then deposited on the porous anode body. The deposition method includes a known method such as application, spraying, and immersion. Among them, an immersion method is preferable because the dispersion (2) containing the conjugated electrically conductive polymer can be deposited and permeated to the porous anode body in a uniform manner. Impregnation may also be performed under reduced pressure so that the porous anode body is completely impregnated in the dispersion (2) containing the conjugated electrically conductive polymer.

The immersion time is usually from 10 seconds to 5 minutes. The temperature of the dispersion (2) containing a conjugated electrically conductive polymer is, though it depends on the type of the aqueous medium, usually from 10 to 35° C.

<Step (C) of Forming Solid Electrolyte Layer>

The method of manufacturing the solid electrolytic capacitor according to the present invention comprises a step (C) of forming a solid electrolyte layer by removing the aqueous medium from the dispersion (2) containing a conjugated electrically conductive polymer deposited on the porous anode body obtained in the step (B). The removal of the aqueous medium in this step (C) does not mean removing all the aqueous medium, and a part of the aqueous medium may remain within a range which does not affect the manufacturing process of the solid electrolytic capacitor.

In terms of efficiency, the preferable method of removing the aqueous medium is drying by heat treatment. The heating conditions can be decided by considering the boiling point and volatility of the aqueous medium. Heating is preferably performed in a temperature range which does not cause deterioration of the electrically conductive polymer by oxygen, for example, from 10 to 300° C., preferably from 50 to 200° C. The preferable heat treatment time is from 5 seconds to several hours. Heat treatment can be performed using, for example, a hot plate, an oven, or a hot-air dryer under the air atmosphere or can be performed under a reduced pressure in order to accelerate the heat treatment.

In the present invention, the step (B) of depositing the dispersion (2) containing the conjugated electrically conductive polymer and the step (C) of forming the solid electrolyte layer can be performed once or repeated two or more times depending on the type of the electrode body. However, in the step (B) from the second time, the dispersion (2) is deposited on the surface of the solid electrolyte layer formed in the step (C). The heat treatment can be performed at each time of deposition of the dispersion in order to remove a part or all of the aqueous medium, or the dispersion can be continuously deposited several times and then the aqueous medium may be removed at the end. In addition, any electrolytic solution can be impregnated after removing a part or all of the aqueous medium included in the deposited dispersion.

By the steps (A) to (C) as described above, a solid electrolytic capacitor comprising a porous anode body made of a valve metal having a dielectric film on the surface thereof and a solid electrolyte layer provided on the surface of the dielectric film can be manufactured.

EXAMPLES

The present invention is described specifically using the following examples and comparative examples. However, the present invention is not limited to these examples. The methods of measuring each physical property of the dispersion in the examples and comparative examples are as follows:

(1) Concentration of Solid Content 10 g of the sample obtained in each example was measured using an infrared radiation moisture meter (manufactured by Kett Electric Laboratory, model: FD-720, heating condition: 110° C./30 min) to calculate the concentration of the solid content in each example. The residue of the evaporation was calculated as the solid content.

(2) pH

The pH of the dispersion obtained in each example was measured using a pH meter (manufactured by DKK-TOA CORPORATION, model: HM-30G) at 25° C.

(3) Viscosity

The viscosity of the dispersion obtained in each example was measured using a rotary viscometer (manufactured by Toki Sangyo Co., Ltd., model: TV25 viscometer) at 23° C., 60 rpm.

(4) Particle Size of Seed Particle

The particle size of the seed particle (including the thickness of the polyanion layer) was measured using a MicroTruck UPA-type particle size distribution measurement apparatus manufactured by NIKKISO CO., LTD.

(5) Weight Average Molecular Weight of Sodium Polystyrenesulfonate

The weight average molecular weight was measured using gel permeation chromatography. A "Shodex® GPC 101" (column OHPak SB-806M HQ) manufactured by Showa Denko K.K. was used for measurement, and the measurement conditions were as follows; column temperature: 40° C., eluent: water, elution speed: 1 mL/min. The weight average molecular weight was represented as the standard polystyrene-converted molecular weight (Mw).

(6) Electrostatic capacity and equivalent series resistance of solid electrolytic capacitor element Electrostatic capacity (µF) at 120 Hz and equivalent series resistance [ESR] (mΩ) at 100 kHz of the solid electrolytic capacitor element were measured using an LCR meter (manufactured by Agilent, model: E4980A).

Example 1

(Preparation of Dispersion of Seed Particles Forming Protective Colloid by Polyanion)

86 g of styrene, 49 g of 2-ethylhexyl acrylate, 15 g of divinylbenzene, and 500 g of an aqueous solution of 22 mass % of sodium polystyrenesulfonate (manufactured by Tosoh Organic Chemical Co., Ltd., Polynus PS-5, weight average molecular weight: approximately 120,000) were stirred and mixed to prepare a mixed solution of ethylenically unsaturated monomers. Meanwhile, 1000 g of an aqueous solution of 22 mass % of sodium polystyrenesulfonate (see above) was continuously stirred and the temperature was increased to 80° C. To this solution, 2 g of potassium persulfate was added. To the obtained solution, the mixed solution of the ethylenically unsaturated monomers and 40 g of aqueous solution of 2.5 mass % of potassium persulfate were added dropwise over 2 hours and 2.5 hours, respectively. After the completion of the dropwise addition, a reaction liquid was allowed to stand at 80° C. for 2 hours, and then the reaction liquid was cooled to room temperature (25° C.). To the resulting reaction liquid, 1500 mL of a cation exchange resin (manufactured by ORGANO CORPORATION, IR120B-H) and 1500 mL of an anion exchange resin (manufactured by ORGANO CORPORATION, IRA410-OH) were added. After stirring for 12 hours, the ion exchange resins were filtered and separated. Ion exchanged water (hereinafter simply referred to as water) was added to the filtrate to adjust the concentration of the solid content to be 15.0 mass %. Thereby, a dispersion of seed particles (particle size d50: 0.46 µm) forming a protective colloid by a polyanion was obtained.

(Step (A): Production of Dispersion (1) of Conjugated Electrically Conductive Polymer by Polymerization)

223.2 parts by mass of water, 31.5 parts by mass of an aqueous solution of 12 mass % of sodium polystyrenesulfonate (see above), and 34.0 parts by mass of the dispersion of seed particles forming a protective colloid by a polyanion produced as defined above were stirred and mixed in a polyethylene container at 32° C. 2.80 parts by mass of 3,4-ethylenedioxythiophene was added to this mixed liquid at 32° C., and it was subjected to emulsification using a homomixer (manufactured by Tokushu Kika Kogyo Co., Ltd., ROBOMIX; 4000 rpm) for 30 minutes to prepare a dispersion of the monomer compound. The amount of the sulfo group and the group consisting of a salt of a sulfo group was 1.9 mol relative to 1 mol of 3,4-ethylenedioxythiophene. Note that the sulfo group, etc. are derived from sodium polystyrenesulfonate in the aqueous solution of 12 mass % of sodium polystyrenesulfonate and the dispersion described above.

291.5 parts by mass of the dispersion of the monomer compound was loaded into a stainless vessel connected with a high-shear mixer (manufactured by Pacific Machinery & Engineering Co., Ltd., MILDER® 303V; 5000 rpm) and a circulation pump to be stirred while circulating at 32° C. using a stirring blade and the high-shear mixer. 5.89 parts by mass of sodium peroxodisulfate and 6.88 parts by mass of 1 mass % of a solution of iron (III) sulfate hexahydrate as oxidants were added to the dispersion to perform a polymerization reaction for 24 hours and thereby, a dispersion (1-1) comprising a conjugated electrically conductive polymer was obtained. The used amount of the polyanion was 261 parts by mass relative to 100 parts by mass of the conjugated electrically conductive polymer.

(Step (A): Production of Dispersion (2) of Conjugated Electrically Conductive Polymer by Dispersion Treatment)

Pure water was added to the dispersion (1-1) having 5.80 mass % of solid content concentration to adjust the solid content concentration to 4.73 mass % and the total amount to 1500 mL. Then, the dispersion (1-1) (hereinafter, "dispersion (1-1)" means, without distinction, both the dispersion (1-1) described above and resultants obtained by performing various operations (such as addition of pure water, high-pressure dispersion treatment, and ion exchange) on the dispersion (1-1) described above (excluding the dispersion (2-1) that is the final product)) was subjected to a high-pressure dispersion treatment for 45 minutes in total in a condition of 400 bar of the dispersion pressure using a high-pressure homogenizer (TWIN PANDA 600, manufactured by Niro Soavi). In this high-pressure dispersion treatment, 9-minute high-pressure dispersion treatment and 10-minute pausing were repeated four times and then, high-pressure dispersion treatment was performed for 9 minutes. The viscosity of the dispersion (1-1) at the initiation of the final pausing was 900 mPa·s, and the viscosity of the dispersion (1-1) at the completion of the final pausing was 4500 mPa·s. The latter was 5.0 times higher than the former. Then, pure water was added to the dispersion (1-1) to adjust the solid content concentration to 3.99 mass % and the total amount to 1500 mL. The dispersion (1-1) was subjected to the high-pressure dispersion treatment again for 135 minutes using the high-pressure homogenizer at 400 bar without pausing. Immediately after the treatment, 100.5 g of a cation exchange resin and 87.9 g of an anion exchange resin were used to perform ion exchange for 3 hours for demineralization. The dispersion (1-1) was filtered through a filter having a pore size of 5 μm and was further filtered through a filter having a pore size of 3 μm. Pure water was added to adjust the solid content concentration to 1.60 mass % and thereby, a dispersion (2-1) of a conjugated electrically conductive polymer with pH 1.9 was obtained.

The schematic view of the step (A) is shown in the FIGURE.

(Formation of Porous Anode Body Having Dielectric Oxide Film on Surface)

A porous anode body having a dielectric oxide film on the surface thereof used for a solid electrolytic capacitor was manufactured by the method described in patent literature JP-A 2011-77257. Specifically, niobium powder for a capacitor was used to produce a porous anode body with an anode lead wherein a dielectric oxide film having niobium pentoxide was formed on the surface of the anode body. The electrostatic capacity of this porous anode body in 20 mass % of sulfuric acid was 21.4 μF.

(Step (B) and (C): Production of Solid Electrolytic Capacitor)

The porous anode body obtained by the method described above was impregnated in the dispersion (2-1) of the conjugated electrically conductive polymer for 1 minute in an air atmosphere at 25° C. Then, the anode body was dried using a hot-air dryer (manufactured by TABAI, model: ST-110) for 30 minutes at 120° C. This treatment was repeated 10 times to form a solid electrolyte layer on the surface of the dielectric oxide film of the porous anode body and thereby, a solid electrolytic capacitor was obtained.

Next, a carbon paste was applied to the solid electrolytic capacitor in such a way not to contact the anode lead terminal and dried. A silver paste was applied to form a contact point of the anode and a contact point of the cathode, respectively, and dried on the lead frame. The anode lead wire was electrically connected to the anode lead part of the lead frame and was sealed with a resin to obtain a solid electrolytic capacitor element.

Example 2

A solid electrolytic capacitor element was manufactured in a similar manner to Example 1 except for changing the pausing time to 30 minutes per single pausing.

Example 3

A solid electrolytic capacitor element was manufactured in a similar manner to Example 1 except that 6-minute high-pressure dispersion treatment and 10-minute pausing were repeated seven times and then high-pressure dispersion treatment was performed for 3 minutes in a 45-minute high-pressure dispersion treatment.

Example 4

(Step (B): Manufacture of Dispersion (1) Containing Conjugated Electrically Conductive Polymer (Containing No Seed Particles)

231.0 parts by mass of water, 60.0 parts by mass of an aqueous solution of 12 mass % of sodium polystyrenesulfonate were stirred and mixed in a polyethylene container at 32° C. 2.80 parts by mass of 3,4-ethylenedioxythiophene was added to this mixed liquid at 32° C. and the mixture was subjected to emulsification using a homomixer (manufactured by Tokushu Kika Kogyo Co., Ltd., ROBOMIX; 4000 rpm) for 30 minutes to prepare a dispersion of the monomer compound.

293.8 parts by mass of the dispersion of the monomer compound was loaded into a stainless vessel connected with a high-shear mixer (manufactured by Pacific Machinery & Engineering Co., Ltd., MILDER® 303V; 5000 rpm) and a circulation pump and stirred while circulating at 32° C. using a stirring blade and the high-shear mixer. 5.89 parts by mass of sodium peroxodisulfate and 6.88 parts by mass of 1 mass % of an aqueous solution of iron (III) sulfate hexahydrate as oxidants were added to perform a polymerization reaction for 24 hours and thereby, a dispersion (1-4) containing a conjugated electrically conductive polymer was obtained.

A solid electrolytic capacitor element was manufactured in a similar manner to Example 1 except for changing the dispersion (1-1) to the dispersion (1-4).

Example 5

A solid electrolytic capacitor element was obtained in a similar manner to Example 1 except for changing the high-pressure dispersion treatment using a high-pressure homogenizer to a dispersion treatment using an ultrasonic homogenizer. The power consumption of the ultrasonic homogenizer was 100 W/L, and the exposure time was 1 hour/L.

Example 6

A solid electrolytic capacitor element was manufactured in a similar manner to Example 1 except for changing the dispersion pressure of the high-pressure dispersion treatment to 250 bar.

Example 7

A solid electrolytic capacitor element was manufactured in a similar manner to Example 1 except that ammonium sulfate was added as a salt compound to the dispersion (1-1) immediately before subjecting it to a high-pressure dispersion treatment.

Example 8

A solid electrolytic capacitor element was manufactured in a similar manner to Example 1 except that 5 parts by mass of ethylene glycol was added, as an electrical conductivity improving agent, relative to 95 parts by mass of the dispersion (2-1) to the dispersion (2-1) of the conjugated electrically conductive polymer and thereby, a dispersion (2-8) of a conjugated electrically conductive polymer was obtained.

Comparative Example 1

A solid electrolytic capacitor element was manufactured in a similar manner to Example 1 except that the pausing was not performed during the high-pressure dispersion treatment. The measurement of the viscosity of the dispersion was performed 36 minutes after the initiation of the high-pressure dispersion treatment.

Comparative Example 2

A solid electrolytic capacitor element was manufactured in a similar manner to Example 4 except that the pausing was not performed during the high-pressure dispersion treatment. The measurement of the viscosity of the dispersion was performed 36 minutes after the initiation of the high-pressure dispersion treatment.

Comparative Example 3

A solid electrolytic capacitor element was manufactured in a similar manner to Example 5 except that the pausing was not performed in the dispersion treatment. The measurement of the viscosity of the dispersion was performed 36 minutes after the initiation of the dispersion treatment.

Comparative Example 4

A solid electrolytic capacitor element was manufactured in a similar manner to Example 6 except that the pausing was not performed in the dispersion treatment. The measurement of the viscosity of the dispersion was performed 36 minutes after the initiation of the high-pressure dispersion treatment.

The manufacturing conditions and the evaluation results (electrostatic capacity and equivalent series resistance) of Examples 1 to 8 and Comparative Examples 1 to 4 are shown in Table 1.

TABLE 1

| | | Example 1 | Example 2 | Example 3 |
|---|---|---|---|---|
| Object with which PEDOT forms complex | | Particle forming a protective colloid | Particle forming a protective colloid | Particle forming a protective colloid |
| Dispersion treatment step | Dispersion method | High-pressure homogenizer | High-pressure homogenizer | High-pressure homogenizer |
| | Pressure (bar) | 400 | 400 | 400 |
| | Total dispersion treatment time (min) | 180 | 180 | 180 |
| | Total dispersion pausing time (min) | 40 | 120 | 70 |
| | Dispersion treatment time per operation (min) | 9 | 9 | 1st to 7th operation: 6 8th operation: 3 |
| | Dispersion pausing time per operation (min) | 10 | 30 | 10 |
| Thickening agent | Ammonium sulfate | — | — | — |
| Viscosity | Timing of measurement | During 4th pausing | During 4th pausing | During 7th pausing |
| | Viscosity immediately after pausing dispersion treatment $\eta_0$ (mPa · s) | 900 | 930 | 920 |
| | Viscosity immediately before resuming dispersion treatment $\eta_1$ (mPa · s) | 4500 | 6603 | 4876 |
| | Thickening ratio ($\eta_1/\eta_0$) | 5.0 | 7.1 | 5.3 |
| Electrical conductivity improving agent | Ethylene glycol | — | — | — |
| Dispersion for impregnation | pH | 1.9 | 1.9 | 1.9 |
| Evaluation of solid electrolytic capacitor element | Electrostatic capacity (µF@120 Hz) | 34.0 | 34.3 | 34.5 |
| | ESR (mΩ@100 kHz) | 215 | 213 | 211 |

| | | Example 4 | Example 5 | Example 6 |
|---|---|---|---|---|
| Object with which PEDOT forms complex | | Polyanion | Particle forming a protective colloid | Particle forming a protective colloid |
| Dispersion treatment step | Dispersion method | High-pressure homogenizer | Ultrasonic | High-pressure homogenizer |
| | Pressure (bar) | 400 | — | 250 |
| | Total dispersion treatment time (min) | 180 | 180 | 180 |
| | Total dispersion pausing time (min) | 40 | 40 | 40 |
| | Dispersion treatment time per operation (min) | 9 | 9 | 9 |
| | Dispersion pausing time per operation (min) | 10 | 10 | 10 |
| Thickening agent | Ammonium sulfate | — | — | — |
| Viscosity | Timing of measurement | During 4th pausing | During 4th pausing | During 4th pausing |
| | Viscosity immediately after pausing dispersion treatment $\eta_0$ (mPa · s) | 880 | 850 | 890 |

TABLE 1-continued

|  |  |  |  |  |
|---|---|---|---|---|
|  | Viscosity immediately before resuming dispersion treatment η1 (mPa·s) | 4840 | 3400 | 3649 |
|  | Thickening ratio (η1/η0) | 5.5 | 4.0 | 4.1 |
| Electrical conductivity improving agent | Ethylene glycol | — | — | — |
| Dispersion for impregnation | pH | 1.8 | 1.9 | 1.9 |
| Evaluation of solid electrolytic capacitor element | Electrostatic capacity (μF@120 Hz) | 35.0 | 35.6 | 34.0 |
|  | ESR (mΩ@100 kHz) | 206 | 230 | 216 |

|  |  | Example 7 | Example 8 | Comparative Example 1 |
|---|---|---|---|---|
| Object with which PEDOT forms complex |  | Particle forming a protective colloid | Particle forming a protective colloid | Particle forming a protective colloid |
| Dispersion treatment step | Dispersion method | High-pressure homogenizer | High-pressure homogenizer | High-pressure homogenizer |
|  | Pressure (bar) | 400 | 400 | 400 |
|  | Total dispersion treatment time (min) | 180 | 180 | 180 |
|  | Total dispersion pausing time (min) | 40 | 40 | 0 |
|  | Dispersion treatment time per operation (min) | 9 | 9 | 45 |
|  | Dispersion pausing time per operation (min) | 10 | 10 | 0 |
| Thickening agent | Ammonium sulfate | 1.5 g/1.5 L | — | — |
| Viscosity | Timing of measurement | During 4th pausing | During 4th pausing | 36 minutes after initiating dispersion treatment |
|  | Viscosity immediately after pausing dispersion treatment η0 (mPa·s) | 1250 | 900 | 890 |
|  | Viscosity immediately before resuming dispersion treatment η1 (mPa·s) | 7625 | 4500 | — |
|  | Thickening ratio (η1/η0) | 6.1 | 5.0 | — |
| Electrical conductivity improving agent | Ethylene glycol | — | 5 parts by mass (relative to 95 parts by mass of dispersion (2-1)) | — |
| Dispersion for impregnation | pH | 1.9 | 1.9 | 1.9 |
| Evaluation of solid electrolytic capacitor element | Electrostatic capacity (μF@120 Hz) | 35.7 | 52.1 | 19.7 |
|  | ESR (mΩ@100 kHz) | 205 | 165 | 389 |

|  |  | Comparative Example 2 | Comparative Example 3 | Comparative Example 4 |
|---|---|---|---|---|
| Object with which PEDOT forms complex |  | Polyanion | Particle forming a protective colloid | Particle forming a protective colloid |
| Dispersion treatment step | Dispersion method | High-pressure homogenizer | Ultrasonic | High-pressure homogenizer |
|  | Pressure (bar) | 400 | - | 250 |
|  | Total dispersion treatment time (min) | 180 | 180 | 180 |
|  | Total dispersion pausing time (min) | 0 | 0 | 0 |
|  | Dispersion treatment time per operation (min) | 45 | 45 | 45 |
|  | Dispersion pausing time per operation (min) | 0 | — | 0 |
| Thickening agent | Ammonium sulfate | — | — | — |
| Viscosity | Timing of measurement | 36 minutes after initiating dispersion treatment | 36 minutes after initiating dispersion treatment | 36 minutes after initiating dispersion treatment |
|  | Viscosity immediately after pausing dispersion treatment η0 (mPa·s) | 890 | 860 | 870 |
|  | Viscosity immediately before resuming dispersion treatment η1 (mPa·s) | — | — | — |
|  | Thickening ratio (η1/η0) | — | — | — |
| Electrical conductivity improving agent | Ethylene glycol | — | — | — |

TABLE 1-continued

| | | | | |
|---|---|---|---|---|
| Dispersion for impregnation | pH | 1.8 | 1.9 | 1.9 |
| Evaluation of solid electrolytic capacitor element | Electrostatic capacity (μF@120 Hz) | 22.5 | 17.0 | 18.8 |
| | ESR(mΩ@100 kHz) | 355 | 423 | 410 |

It was found from the results of table 1 that, in the step of depositing a dispersion to the porous anode body made of a valve metal having a dielectric film, the solid electrolytic capacitor elements in Examples 1 to 8, in which the dispersion (2) of the conjugated electrically conductive polymer was used, exhibited a high capacity development ratio (electrostatic capacity) and a low equivalent series resistance (ESR) in comparison to the solid electrolytic capacitor elements of Comparative Examples 1 to 4 using a dispersion which was not thickened by pausing the dispersion treatment in the step (A).

Since the dispersion (1) containing the polyanion and the conjugated electrically conductive polymer is subjected to dispersion treatment in the present invention, it is not realistic to show all of the configurations, which the solid electrolyte layer formed by removing an aqueous medium from the dispersion (2) and the solid electrolytic capacitor can take.

The invention claimed is:

1. A method of manufacturing a solid electrolytic capacitor comprising a porous anode body made of a valve metal having a dielectric film on a surface thereof, and a solid electrolyte layer disposed on a surface of the dielectric film, the method comprising:
   a step (A) of, in a liquid comprising a polyanion and an aqueous medium, polymerizing a monomer compound for obtaining a conjugated electrically conductive polymer to obtain a dispersion (1) containing the conjugated electrically conductive polymer and subjecting the dispersion (1) to a dispersion treatment to obtain a dispersion (2) containing the conjugated electrically conductive polymer;
   a step (B) of depositing the dispersion (2) on a porous anode body made of a valve metal having a dielectric film on a surface thereof; and
   a step (C) of removing the aqueous medium from the dispersion (2) deposited on the porous anode body to form a solid electrolyte layer,
   wherein in the step (A), an operation which pauses the dispersion treatment is performed once or several times, and the pausing time is from 1 to 6000 minutes in total and is from 1 to 300 minutes per operation.

2. The method of manufacturing a solid electrolytic capacitor according to claim 1, wherein seed particles forming a protective colloid by a polyanion are dispersed in the aqueous medium.

3. The method of manufacturing a solid electrolytic capacitor according to claim 1, wherein the operation which pauses the dispersion treatment is performed from 2 to 20 times.

4. The method of manufacturing a solid electrolytic capacitor according to claim 1, wherein the time for which the dispersion treatment is paused is from 6 to 2250 minutes in total.

5. The method of manufacturing a solid electrolytic capacitor according to claim 1, wherein a viscosity of the dispersion (1) after the pause is from 1.05 to 100.0 times higher than a viscosity before the pause.

6. The method of manufacturing a solid electrolytic capacitor according to claim 1, wherein a salt compound is added to the dispersion (1) in the step (A).

7. The method of manufacturing a solid electrolytic capacitor according to claim 2, wherein the seed particles are particles of a polymer of an ethylenically unsaturated monomer.

8. The method of manufacturing a solid electrolytic capacitor according to claim 1, wherein the dispersion treatment comprises a dispersion treatment by ultrasonic irradiation in the step (A).

9. The method of manufacturing a solid electrolytic capacitor according to claim 1, wherein the dispersion treatment comprises a dispersion treatment using a high-pressure homogenizer in the step (A).

10. The method of manufacturing a solid electrolytic capacitor according to claim 1, wherein the monomer compound is at least one selected from the group consisting of a pyrrole compound, an aniline compound, and a thiophene compound.

11. The method of manufacturing a solid electrolytic capacitor according to claim 1, wherein the monomer compound is a compound represented by the following formula (1):

(1)

(wherein R1 and R2 each independently represent a hydrogen atom, a hydroxy group, an alkyl group which may have a substituent and in which the number of carbons in the part other than the substituent is from 1 to 18, an alkoxy group which may have a substituent and in which the number of carbons in the part other than the substituent is from 1 to 18, or an alkylthio group which may have a substituent and in which the number of carbons in the part other than the substituent is from 1 to 18, or $R^1$ and $R^2$ are bonded to each other and represent an alicycle which may have a substituent and in which the number of carbons in the part other than the substituent is from 3 to 10, an aromatic ring which may have a substituent and in which the number of carbons in the part other than the substituent is from 6 to 10, a heterocyclic ring containing an oxygen atom which may have a substituent and in which the number of carbons in the part other than the substituent is from 2 to 10, a heterocyclic ring containing a sulfur atom which may have a substituent and in which the number of carbons in the part other than the substituent is from 2 to 10, or a heterocyclic ring containing a sulfur atom and an oxygen atom which may have a substituent and the number of carbons in the part other than the substituent is from 2 to 10.

12. The method of manufacturing a solid electrolytic capacitor according to claim 1, wherein the polyanion is a polymer having at least one of a sulfo group and a group consisting of a salt of a sulfo group.

13. The method of manufacturing a solid electrolytic capacitor according to claim 1, wherein the polyanion is used in an amount such that the ratio of anionic groups in the polyanion is from 0.25 to 30.00 mol relative to 1 mol of the monomer compound.

14. The method of manufacturing a solid electrolytic capacitor according to claim 1, wherein the polymerization is performed using at least one oxidant selected from peroxodisulfuric acid and a salt thereof in the step (A).

15. A method of manufacturing a dispersion (2) containing a conjugated electrically conductive polymer, comprising a step (A) of, in a liquid including a polyanion and an aqueous medium, polymerizing a monomer compound for obtaining a conjugated electrically conductive polymer to obtain a dispersion (1) containing the conjugated electrically conductive polymer and subjecting the dispersion (1) to a dispersion treatment to obtain a dispersion (2) containing the conjugated electrically conductive polymer, wherein in the step (A), an operation which pauses the dispersion treatment is performed once or several times, and the pausing time is from 1 to 6000 minutes in total and is from 1 to 300 minutes per operation.

\* \* \* \* \*